United States Patent
Keto-Tokoi

[11] Patent Number: 5,772,378
[45] Date of Patent: Jun. 30, 1998

[54] PRE-TENSIONING DEVICE FOR FASTENING ELEMENTS AND METHOD FOR PRE-TENSIONING A FASTENING ELEMENT

[75] Inventor: Jyrki Matti Keto-Tokoi, Tampere, Finland

[73] Assignee: Kvaerner Tamturbine Oy, Tampere, Finland

[21] Appl. No.: 647,915

[22] PCT Filed: Nov. 30, 1994

[86] PCT No.: PCT/FI94/00539

§ 371 Date: Aug. 1, 1996

§ 102(e) Date: Aug. 1, 1996

[87] PCT Pub. No.: WO95/15442

PCT Pub. Date: Jun. 8, 1995

[30] Foreign Application Priority Data

Nov. 30, 1993 [FI] Finland ................................. 935329
Nov. 30, 1993 [FI] Finland ................................. 935330

[51] Int. Cl.⁶ .............................. F16B 35/00; F16B 37/08
[52] U.S. Cl. ...................... 411/432; 411/395; 411/909; 411/916; 411/917; 29/447
[58] Field of Search .............................. 411/432, 433, 411/434, 395, 411, 424, 909, 916, 917; 29/447

[56] References Cited

U.S. PATENT DOCUMENTS

| | | |
|---|---|---|
| 2,571,265 | 10/1951 | Leufven ........................ 411/917 X |
| 3,835,523 | 9/1974 | Stansfield ...................... 411/916 X |
| 4,120,230 | 10/1978 | Schutzler . |
| 4,450,616 | 5/1984 | Morita . |
| 4,884,934 | 12/1989 | Ikeda et al. . |
| 4,897,006 | 1/1990 | Blin . |
| 4,991,563 | 2/1991 | Ashley ........................... 411/916 X |
| 5,010,949 | 4/1991 | Dehaine ........................ 411/909 X |
| 5,248,233 | 9/1993 | Webster . |
| 5,366,331 | 11/1994 | Ergres ........................... 411/909 X |

FOREIGN PATENT DOCUMENTS 37 33 243  10/1987  Germany .

*Primary Examiner*—Neill R. Wilson
*Attorney, Agent, or Firm*—Pollock Vande Sande & Priddy

[57] ABSTRACT

A pre-tensioning device is used with a fastening element for fastening pieces together, the fastening element having a tightening element movable longitudinally along a first region thereof, which fastening element is to be subjected to a pre-tensioning expansion. The device comprises a locking piece fixedly attachable to the first region of the fastening element and extending over the tightening element; the tightening element being movable with respect to a piece to be fastened independently of the locking piece; and an annular sleeve made of a shape memory metal and positioned between the locking piece and the piece which is to be fastened to another piece, whereby when the annular sleeve is heated it undergoes an expansion due to a phase transformation and forces the locking piece upwards such that the fastening element is stretched and the tightening element can be tightened against the piece to be fastened.

17 Claims, 3 Drawing Sheets

PRE-TENSIONING DEVICE FOR FASTENING ELEMENTS AND METHOD FOR PRE-TENSIONING A FASTENING ELEMENT

FIELD OF THE INVENTION

The invention relates to a pre-tensioning device for a screw or similar fastening element, which is used particularly to pre-tension large screws during an assembling operation.

BACKGROUND OF THE INVENTION

It is preferred that the pre-tensioning is carried out by stretching the screw using a certain pre-calculated force before a nut is screwed tight. For performing this step, some pre-tensioning tools have been developed, of which for instance hydraulic pre-tensioning devices can be mentioned, one example being described in the Swedish publication 7701049-4, where a screw is stretched by means of hydraulic pressure and thereafter the nut is screwed down. After removing the pressure, the coupling will be tightened and the desired pre-stress will remain in the screw.

In the above-mentioned case, the streching takes place at the end of the screw to be stretched, but often also a piston-like part is placed in a hole bored inside the screw, and hydraulic pressure can be exerted on one end of the piston-like part. Here, the stretching force will be directed by the contribution of the piston directly to the screw ends, between which the pre-tensioning elongation will thus be present.

In German publication DE-OS 3733243 a piston element is used which is placed within a hole bored inside a screw and which can also be heated. In some cases, a steel rod placed within a screw is used, being heatable for instance with electric current, whereby the rod will stretch the screw to be pre-tensioned through the thermal expansion caused by the heat introduced therein. All above-mentioned methods require complicated devices and tools, which often have to be each manufactured for the respective screw size.

U.S. Pat. No. 5,248,233 discloses a releasing device for a screw coupling, employing a phase change of a shape-memory metal cylinder provided with a heating element to release a segmented nut without causing a shock effect on the structure. This patent discloses no pre-tensioning for performing a fastening operation.

U.S. Pat. No. 4,450,616 discloses a shape-memory metal disc utilizing the properties of the shape-memory metal only for ensuring the tightness. of a nut or a screw.

SUMMARY OF THE INVENTION

In the pre-tensioning device according to the present invention, most drawbacks associated with the presently known devices have been eliminated. The device according to the present invention is based on the use of shape-memory metals known as such.

The invention is based on a phase transformation occurring in the crystal structure of the shape-memory metal, effected by temperature. This phenomenon is called martensitic reaction. The shapes and volumes of pieces made of shape-memory metal alloys are recovered exactly to correspond to the original status at a relatively low temperature on heating after a deformation caused by an external force. The recovery is still complete typically after a deformation of 4–8%. The martensitic reaction starts and takes place in a quite narrow transition temperature range of typically about 20° C. (range $A_s$ to $A_f$), which can usually be fitted in a desired area within the temperature range of –30° . . . +100° C. On certain conditions, the martensitic reaction is crystallographically completely reversible. The deformations of shape-memory metals are not based on thermal expansion, but on a phase change in the crystalline structure triggered by a temperature change. The transformation takes place quickly once the transformation temperature has been attained. Because of the low transformation temperature, the heating of the piece does not require large amounts of heat.

The shape-memory metals exist as two main groups, whereof one shows a one-way shape-memory effect and the other a two-way effect. For those shape-memory metals which are based on the one-way shape-memory effect, the deformation triggered by a predetermined transformation temperature is irreversible. In the case of the two-way shape-memory effect, the deformation is reversible as the piece is being cooled below a predetermined temperature (range $M_s$ to $M_f$). Hereinafter a shape-memory metal based on the one-way shape-memory effect is designated one-way shape-memory metal, and a shape-memory metal based on the two-way shape-memory effect is designated two-way shape-memory metal, and the temperatures are designated upper transformation temperature ($A_f$) and lower transformation temperature ($M_f$), respectively.

A two-way shape-memory metal has the upper transformation temperature typically within the range of 80° to 100° C., and the piece will not recover its original state until the piece cools or is cooled to the lower transformation temperature, which is typically in the range of –20° C. to +20° C. The above-mentioned cycle can be repeated several times, even up to of 10 000 times depending on the deformation and load.

Several shape-memory metal alloys can withstand very high stresses without plasticizing and losing their shape-memory characteristics, even 800 to 1000 N/mm$^2$, and consequently a piece made of such metal can produce large forces in connection with the deformation.

In a device according to the invention, the phase change starting within the pre-determined transition temperature range of the so-called shape-memory metal is used as the source of stretching power for a fastening element, this change causing a dimensional change in the shape-memory metal piece. The force occurring in association with this dimensional change is used for the stretching of the fastening element. The deformation capacity of a two-way shape-memory metal is typically about 4%, whereas a pre-stress elongation of for example a steel screw, is typically about 0.2% of the elongation length.

In the following, the invention will be described in more detail with reference to the accompanying drawings, wherein

DETAILED DESCRIPTION OF THE PREFERRED EMBODIMENT(S)

In the present invention, the fastening element is understood to mean a fastening element, generally of elongate shape, stretchable upon application of a force and tightenable to a fixed relation to parts to be joined by means of a tightening member movable in the longitudinal direction of the fastening element. The fastening element is freely expandable at least relative to a first piece to be joined, on which the tightening member abuts, and its movement is limited in the stretching direction relative to the second piece to be joined at least when the tightening member is tightened against the first piece.

Figure 1:
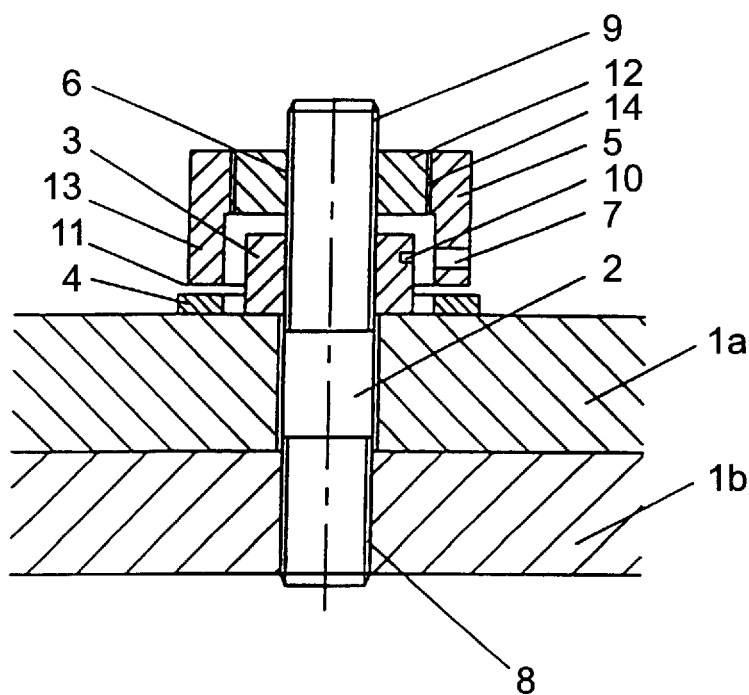
FIG. 1 shows an arrangement and a device according to the invention for pre-tensioning a screw.

In the arrangement according to FIG. 1, the parts 1a, 1b to be joined together are connected by means of a screw 2 acting as the fastening element. In FIG. 1, the screw is shown engaged through a thread 8 with the lower one 1b of the pieces to be joined together and passing through the upper piece 1a. On a thread 9 at the upper end of the screw a tightening member is rotated, for instance a nut 3, and on top of it on the same thread a locking piece 5, inside which the nut 3 has space to move freely. Between a skirt-like edge portion 13 of the locking piece 5 and the piece 1a to be fastened an annular sleeve 4 manufactured of a two-way shape-memory metal is placed. The locking piece 5 and the sleeve 4 together form a pre-tensioning unit where the locking piece 5 acts as a retaining piece receiving the effects which are due to changes in the sleeve 4 and transmits them further to the screw 2.

The device operates in the following way: The sleeve 4 is heated in some way, for example with a heating fan, to the upper transformation temperature, whereby a phase change occurs therein and it expands also in the direction of the screw and through the locking piece 5 will stretch the screw 2 which is able to expand relative to the first piece 1a to be joined. Thereafter the nut 3 can be tightened at recesses 10 in the nut 3 using a known tool inserted through openings 7 in the locking piece 5. After tightening of the nut 3, the shape-memory metal sleeve 4 is allowed to cool or it is cooled to the lower transformation temperature, whereby the sleeve 4 recovers its original dimensions and the screw is tightened. The locking piece 5 can now be released and the shape-memory metal sleeve 4 is removed.

The shape-memory metal sleeve can be dimensioned separately for each screw length and each force required for stretching the screw. However, it is most practical to dimension the sleeve to such a thickness that is sufficient for stretching screws of various lengths up to a determined maximum length. If the expansion required for the pre-tensioned screw is smaller than the expansion of the shape-memory metal sleeve 4, a clearance 11 is left between the shape-memory metal sleeve 4 and the edge portion 13 of the locking piece, the clearance being so dimensioned that the expansion of the shape-memory metal sleeve minus the dimension of the clearance equals the required pre-tensioning expansion of the screw. The clearance can be measured by means of some well-known measuring instrument.

The shape-memory metal sleeve 4 can be heated to the upper transformation temperature in a well-known way by using for example a heating fan or electric resistance element, which can be disposed readily around the sleeve. Because the transformation temperature is relatively low, the amount of the necessary heat is not very large. A sleeve made of a two-way shape-memory metal reverts to its original shape as its temperature drops below the lower transformation temperature. If this temperature lies below the ambient temperature, the cooling to the lower transformation temperature can take place for example with dry ice.

The device according to the invention has the significant advantage in that it allows to use standard screws with heads or tenons. Also the space required by the devices for performing the pre-tensioning is small. No measuring devices are needed for performing the pre-tensioning. The screw can be released using the same device.

By providing the locking piece 5 with several adaptor rings 12, where the internal thread 6 is adapted to the corresponding threading 9 of the screw 2 and the adaptor piece is fastened through an external threading 14 to the edge portion 13 of the locking piece 5, the device can be used for pre-tensioning screws of several sizes.

It is apparent to one skilled in the art that if a long screw is to be pre-tensioned and the deformation of one single shape-memory metal sleeve is not sufficient to give the screw the required pre-tensioning expansion, two or several shape-memory metal sleeves 4 can be placed beneath the locking piece on top of each other. The sleeves can then have standard heights, which allows to obtain the desired expansion required in the pre-tensioning by application of one or several sleeves one on top of the other.

The sleeve can also be divided in its peripheral direction into several sections. In this case it is preferred that instead of the skirt-like edge portion 13, the locking piece 5 comprises two or more separate legs directed towards the part 1a to be joined, under which legs the shape-memory metal pieces are placed.

The shape-memory metal piece can also be fastened to the locking piece 5 in such a way that the pieces are retained together.

Figure 3:
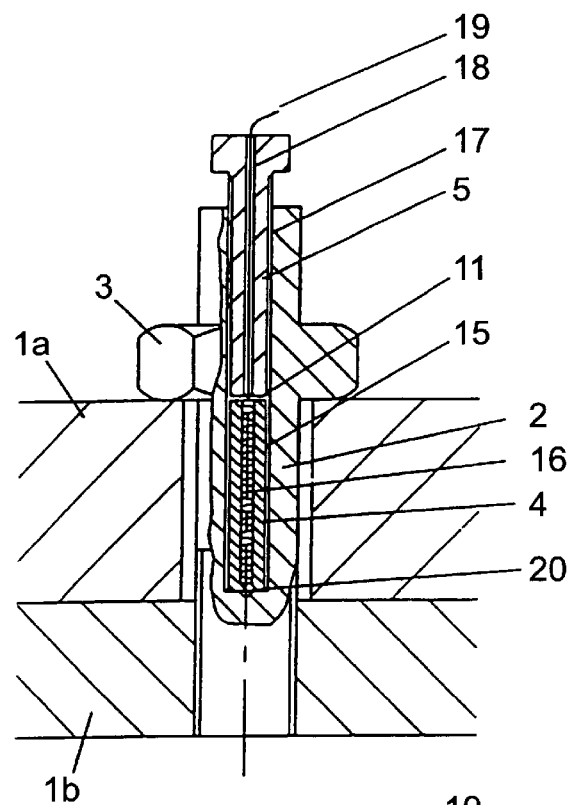
FIG. 3 shows another device designed for pre-tensioning of a fastening element according to the invention, utilizing a shape-memory metal cartridge placed inside the fastening element for pre-tensioning.

FIG. 3 shows another, alternative embodiment, which employs a pre-tensioning unit supported by the bottom of a hole located inside the fastening element. A hole 15 has been bored in the center of the screw 2 to be pre-tensioned and it receives a shape-memory metal cartridge 4. Inside the cartridge a heating element 16 is placed, which can be for instance an electric resistance element heatable by electricity. A restrictor screw 5 acting as a retaining piece can be fastened in an internal thread 17 on one end of the screw on the mouth side of the hole 15. The restrictor screw will hereinafter be designated as a restrictor. The electric wires 19 to the cartridge 4 pass through the restrictor along a hole 18 bored therein. The hole 15 bored in the screw 2 extends mainly over the area which should be expanded during the pre-tensioning of the screw 2.

The device operates in the following way: The screw 2 to be pre-tensioned is mounted in its place and the shape-memory metal cartridge 4 is placed in the screw hole 15. The restrictor is rotated into the thread 17 in such a fashion that the wires 19 for the heating element 16 of the cartridge pass through the hole 18 of the restrictor 5. By rotating suitably the restrictor, a clearance 11 can be left between the cartridge 4 and the restrictor 5, the clearance being so dimensioned that the change of length of the shape-memory metal cartridge 4 minus the clearance equals the desired elongation of the screw. When the shape-memory metal cartridge 4 is heated by the heating element 16 to the upper transformation temperature, a deformation in the form of length increase of the cartridge will take place, which in turn through the bottom 20 of the hole 15 and through the restrictor 5 stretches the screw 2. While the screw is in the streched state, the nut 3 is tightened. As the shape-memory metal cartridge 4 cools to the lower transformation temperature, it reverts to its original dimension, and the screw 2 has been pre-tensioned. The restrictor 5 and the cartridge 4 can now be removed. The releasing of the screw 2 is carried out in an analogous manner.

In the description above, the screw 2 is heated by an electric resistance. It is apparent to one skilled in the art that the heating can take place also in some other known way.

The shape-memory metal cartridge 4 can be separately dimensioned for each screw length and each force required for the stretching of the screw 2. It is, however, practical that the cartridge is dimensioned to have such length that it is sufficient for stretching a screw of a given length. If the elongation required for the screw to be pre-tensioned is smaller than the elongation of the shape-memory metal cartridge 4, a clearance 11 can be left between the shape-memory metal cartridge 4 and the restrictor, and so the same cartridge can be used for pre-tightening of screws of several sizes. The clearance can be measured by first screwing the restrictor 5 down and thereafter by opening it by a given number of revolutions or by measuring the extent of protrusion of the restrictor in some well-known manner.

Figure 4:
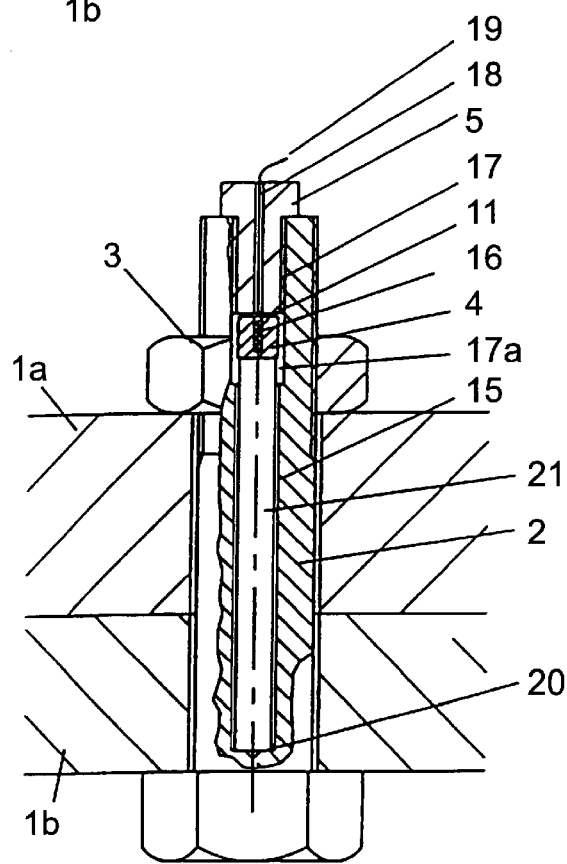
FIG. 4 shows a third alternative embodiment according to the invention for performing pre-tensioning by means of a shape-memory metal cartridge, whereby a part of the cartridge is replaced with a steel rod, and FIG. 5 a fourth embodiment according to the invention where the shape-memory metal cartridge is placed outside a hole of the fastening element and with a steel rod placed in the hole for transmission of force.

FIG. 4 shows a third alternative embodiment, for performing the pre-tensioning operation. A restrictor 5 is rotated in the internal thread 17 on the mouth portion of a hole 15 located at one end of the screw 2 to be pre-tensioned. In a non-threaded extension 17a of the mouth portion is placed a shape-memory metal cartridge 4. From the cartridge 4 extends a metal rod 21 placed within the bore 15 extending inside the screw, the purpose of which rod is to transmit the force caused by the deformation of the shape-memory metal cartridge to the other end of the screw 2 through the bottom 20 of the bore. The device operates in the same manner as described hereinbefore.

Figure 5:
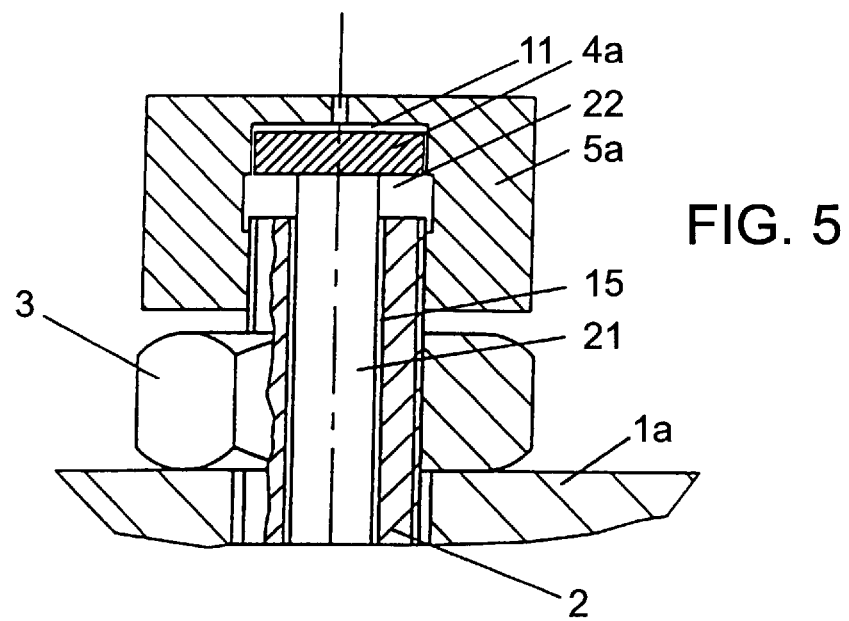

FIG. 5 shows a fourth alternative embodiment, where the shape-memory metal cartridge 4 is placed outside the screw hole and for example a steel rod 21 has been placed in the hole. The steel rod is longer than the hole bored in the screw 2 and so dimensioned that it will withstand the force required for stretching the screw 2. A nut 3 and thereafter a restrictor nut 5a corresponding to the restrictor 5 of FIG. 3 have been rotated at the end of the screw 2 on its thread, the former being designated hereinafter restrictor and accommodating in its interior at least one cylindrical shape-memory metal piece 4a corresponding to the shape-memory metal cartridge 4 of FIG. 3. The piece abuts on the rod 21 and on its inner side on the restrictor 5a. The heating of the shape-memory metal cylinder 4a to the upper transformation temperature can take place by means of a heating element placed inside it or the heating element can be placed in a space 22 inside the restrictor. The heating can be performed also by heating the restrictor 5a from the outside, whereby the heat will be conducted along the restrictor to the shape-memory metal cylinder 4a starting there the desired phase change, which causes the transformation giving rise to a expansion force for the screw 2. The force is transmitted from the shape-memory metal cylinder 4a through the restrictor 5a to one end of the screw 2, as well as through the rod 21 to the other end of the screw 2, thus stretching the screw. After the screw 2 has been pre-tensioned in this way, the nut 13 is screwed down onto the first piece 1a to be joined, relative to which the screw has been able to expand freely, the operation being performed in the same way as in FIGS. 3 and 4. After the shape-memory metal cylinder 4a has been cooled, or during its cooling to the lower transformation temperature, it recovers its original dimensions, and the pre-tensioning means, the restrictor 5a, the shape-memory metal cylinder 4a, the possible heating element and the rod 21, can be removed. The releasing of the screw takes place in an analogous manner.

It is also possible to use a clearance 11 in the embodiment according to FIG. 5 so that the deformation of the shape-memory metal cartridge 4 or cylinder 4a and the desired screw expansion can be matched to each other, as explained hereinbefore.

In the embodiment according to FIG. 5, also two or more corresponding or variable-length cylinders can be placed on top of each other instead of one single shape-memory metal cartridge 4a, and in this way their joined transformation can be matched to the expansion desired for the screw 2.

Figure 2:
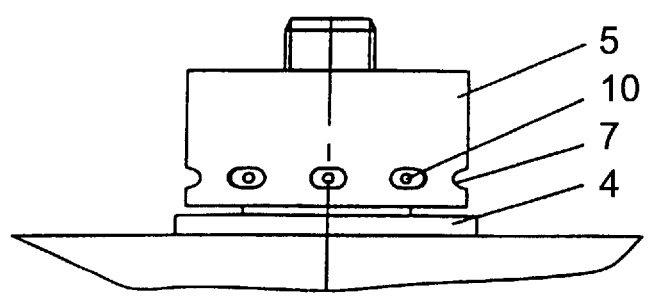
FIG. 2 shows a locking piece and an actual tightening element according to the invention of FIG. 1.

In case a shape-memory metal cartridge 4, 4a made of a one-way shape-memory metal is used in the device, it is difficult to remove it after the pre-tensioning. If a cartridge made of a two-way shape-memory metal is used, it can be easily removed after the pre-tensioning of the cartridge and it can be used again for pre-tensioning of other screws. The same applies to the removal of the shape-memory metal piece from the pre-tensioning device of FIGS. 1 and 2. However, the phenomena taking place during the cooling, such as relaxation and thermal shrinkage, can facilitate the removal of the pre-tensioning device also in case of one-way shape-memory metals.

It is apparent to a man skilled in the art that the invention can also be applied for pre-tensioning other fastening means than those described in the figures and the description, and it is not essential for the function of the device, in which way the heat is brought to the shape-memory metal cartridge.

The shape-memory metals are usually metal alloys, and they are known in a variety of types, for instance a nickel-titanium alloy mixed with additives. The invention is not limited to any single well-known or later discovered shape-memory metal.

I claim:

1. A pre-tensioning device for use with a fastening element for fastening pieces together, said fastening element having a tightening element movable longitudinally along a first region thereof, which fastening element is to be subjected to a pre-tensioning expansion, said device comprising:

a locking piece fixedly attachable to said first region of said fastening element and extending over said tightening element; said tightening element being movable with respect to a piece to be fastened independently of said locking piece; and an annular sleeve made of a shape memory metal and positioned between said locking piece and said piece which is to be fastened to another piece, whereby when said annular sleeve is heated it undergoes an expansion due to a phase transformation and forces said locking piece upwards such that said fastening element is stretched and said tightening element can be tightened against said piece to be fastened.

2. The pre-tensioning device of claim 1 wherein said annular sleeve comprises a two-way shape memory metal having an upper transformation temperature adapted to be above a mounting temperature of the pre-tensioning device.

3. The pre-tensioning device of claim 1 wherein said locking piece is moveable along a threading of said fastening element.

4. The pre-tensioning device of claim 1 wherein said locking piece is attached to an adapter ring which is moveable along a threading of said fastening element.

5. The pre-tensioning device of claim 1 wherein said locking piece is attached to said annular sleeve.

6. The pre-tensioning device of claim 1 wherein said locking piece has at least one opening through which said tightening element can be tightened, against said piece to be fastened, whereby said fastening element is pre-tensioned.

7. A pre-tensioning device for use with a fastening element having a hole extending longitudinally therethrough, said device comprising;

a shape memory metal cartridge adapted to fit inside and rest on a bottom of said hole;

a restrictor adapted to fit inside said hole above said cartridge and attached to an end of the fastening element where the hole is located, whereby when said cartridge is heated to its transformation temperature it expands against said bottom of said hole and said restrictor to effect an elongation of said fastening element.

8. The pre-tensioning device of claim 7 further comprising a heating element placed inside said cartridge whereby said cartridge can be heated to its transformation temperature.

9. The pre-tensioning device of claim 7 further comprising a rod positioned between said bottom of said hole and said cartridge whereby said cartridge will expand against said rod and said restrictor to effect an elongation of said fastening element.

10. A pre-tensioning device for fastening elements which are to be subjected to a pre-tensioning expansion and are used to fasten together at least two pieces, said device comprising:

a pre-tensioning unit connected at its first end to a first end of a fastening element and at its second end to be supported by a rigid structure, in relation to which the pre-tensioning expansion of the fastening element is to take place;

a tightening member, which is separate from the pre-tensioning unit and attached to the fastening element to be movable independently of the pre-tensioning unit relative to a piece to be fastened and limiting the movement of the fastening element in the direction of expansion, said tightening member being arranged to tighten the fastening element by movement relative to said piece to contact with a piece to be joined by means of the fastening element;

the pre-tensioning unit including between the rigid structure and said first end of the fastening element a shape-memory metal element, expandable through a phase change to stretch said fastening element and allow the tightening member to be moved to the tightening position, closer to the piece to be joined by means of the fastening element, before a final tightening of the fastening element.

11. The pre-tensioning device according to claim 10, wherein the pre-tensioning unit comprises a locking piece attached to the first end of said fastening element and said shape-memory metal element located between the locking piece and the rigid structure.

12. The pre-tensioning device according to claim 10, wherein the pre-tensioning unit is designed to be mounted at a mounting temperature and the shape-memory metal element is a two-way shape-memory metal having an upper transformation temperature and a lower transformation temperature, the upper transformation temperature being above the mounting temperature of the pre-tensioning unit.

13. The pre-tensioning device according to claim 10, wherein the locking piece has an adaptor ring adapted to fit said locking piece on the threading of the fastening element, the locking piece further comprising an edge portion attachable to the fitting ring.

14. A method for pre-tensioning a fastening element with a pre-tensioning device including an element made of shape memory metal, comprising the steps of:

attaching one region of said pre-tensioning device to a fastening element;

supporting a second region of said pre-tensioning device by a piece to be fastened to another piece;

heating said element with the shape memory metal so that it expands to stretch and pretension the fastening element;

tightening the fastening element against said piece to be fastened to said another piece via a tightening element which is movable on said fastening element independently of said pre-tensioning device to effect the desired amount of pre-tension.

15. The method of claim 14 wherein said shape memory metal is a two way shape memory metal, said method further comprising the steps of:

cooling said pre-tensioning device to a lower transformation temperature of the shape memory metal;

removing said pre-tensioning device from said fastening element.

16. The method of claim 14 further comprising the step of leaving a clearance, dimensioned in view of the desired pre-tensioning and the expansion of the shape memory metal, between said second region and said piece to be fastened.

17. A method for pre-tensioning a fastening element through a pre-tensioning expansion, comprising the steps of:

attaching one end of the fastening element to a pre-tensioning unit at a first region of the pre-tensioning unit, the pre-tensioning unit being supported at its second region by a rigid structure in relation to which the pre-tensioning expansion takes place, wherein the pre-tensioning unit contains between the rigid structure and said one end of the fastening element a shape-memory metal having a certain transformation temperature where it expands through a phase change;

heating said shape-memory metal to said transformation temperature to expand it and to cause a pre-tensioning effect by stretching the fastening element so that a tightening member attached to the fastening element in tightening relationship therewith and mobile relative to a piece limiting the movement of the fastening element in the direction of expansion, is tightened by moving closer to a piece to be fastened by means of the fastening element to said piece limiting the movement of the fastening element, whereafter the fastening element through contact of the tightening member with the piece to be fastened is tightened finally by removing the pre-tensioning effect of the shape-memory metal.

* * * * *